United States Patent
Lee et al.

(10) Patent No.: US 11,563,887 B2
(45) Date of Patent: Jan. 24, 2023

(54) METHOD FOR CONTROLLING SYNCHRONIZATION OF PLURALITY OF IMAGE SENSORS AND ELECTRONIC DEVICE FOR IMPLEMENTING SAME

(71) Applicant: Samsung Electronics Co., Ltd., Suwon-si (KR)

(72) Inventors: Sangmin Lee, Hwaseong-si (KR); Hwayong Kang, Suwon-si (KR); Dongsoo Kim, Suwon-si (KR); Minyoung Park, Seoul (KR); Hyeon-Cheol Jo, Suwon-si (KR); Youngkwon Yoon, Seoul (KR); Jonghoon Won, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 16/643,262

(22) PCT Filed: Aug. 31, 2018

(86) PCT No.: PCT/KR2018/010144
§ 371 (c)(1),
(2) Date: Feb. 28, 2020

(87) PCT Pub. No.: WO2019/045517
PCT Pub. Date: Mar. 7, 2019

(65) Prior Publication Data
US 2020/0267295 A1    Aug. 20, 2020

(30) Foreign Application Priority Data

Sep. 1, 2017 (KR) .......................... 10-2017-0111951

(51) Int. Cl.
*H04N 5/232* (2006.01)
*H04N 5/225* (2006.01)

(52) U.S. Cl.
CPC ....... *H04N 5/23227* (2018.08); *H04N 5/2258* (2013.01)

(58) Field of Classification Search
CPC ............... H04N 5/2257; H04N 5/2258; H04N 5/232061; H04N 5/23227
See application file for complete search history.

(56) References Cited

U.S. PATENT DOCUMENTS

| 9,066,023 B2 | 6/2015 | Shirakawa |
| 9,066,024 B2 | 6/2015 | Chang et al. |

(Continued)

FOREIGN PATENT DOCUMENTS

| JP | 2012-253599 A | 12/2012 |
| KR | 10-2008-0073073 A | 8/2008 |

(Continued)

OTHER PUBLICATIONS

"HAL Subsystem", Known to inventor/ https://source.android.com/devices/camera/camera3_requests_hal; Jan. 6, 2020.

(Continued)

*Primary Examiner* — Daniel M Pasiewicz
(74) *Attorney, Agent, or Firm* — Jefferson IP Law, LLP

(57) ABSTRACT

Provided in various embodiments are an electronic device and a method therefor, the electronic device comprising: a first image sensor; a second image sensor electrically connected through a designated interface to the first image sensor; and a processor, wherein the processor is set to determine parameter information, for controlling the first image sensor and the second image sensor, in relation to photographing and transmit the determined parameter information to the first image sensor and the second image sensor, (Continued)

and the first image sensor is set to transmit a reflection signal through the designated interface to the second image sensor such that the second image sensor uses the parameter information in response to the reflection signal. In addition, other embodiments are possible.

14 Claims, 16 Drawing Sheets

(56) References Cited

U.S. PATENT DOCUMENTS

| | | | |
|---|---|---|---|
| 2011/0119405 | A1 | 5/2011 | Parr et al. |
| 2012/0194712 | A1 | 8/2012 | Crook et al. |
| 2017/0187928 | A1 | 6/2017 | Kim et al. |
| 2020/0014838 | A1* | 1/2020 | Mitsubayashi ...... H04N 5/0733 |

FOREIGN PATENT DOCUMENTS

| | | |
|---|---|---|
| KR | 10-2011-0123127 A | 11/2011 |
| KR | 10-2017-0076398 A | 7/2017 |
| WO | 2015/000440 A1 | 1/2015 |

OTHER PUBLICATIONS

Gabor Szanto, "Rebooting Android's 10 Millisecond Problem : Audio Latency Improvements in Android 6.0 Marshmallow", Known to inventor/ http://superpowered.com/android-marshmallow-latency; Jun. 2016.

Korean Office Action dated Aug. 22, 2022, issued in Korean Patent Application No. 10-2017-0111951.

* cited by examiner

METHOD FOR CONTROLLING SYNCHRONIZATION OF PLURALITY OF IMAGE SENSORS AND ELECTRONIC DEVICE FOR IMPLEMENTING SAME

TECHNICAL FIELD

Various embodiments relate to a method and an apparatus for controlling synchronization of a plurality of image sensors.

BACKGROUND ART

With the recent enhancement of digital technology, various types of electronic devices such as mobile communication terminals, personal digital assistants (PDAs), electronic schedulers, smal phones, tablet personal computers (PCs), wearable devices, or the like are widely used. To support and increase functions of such electronic devices, hardware portions and/or software portions of electronic devices are continuously developed. For example, an electronic device may include a dual camera, and may synthesize two images of different portions shot by respective cameras into one image and may provide the image. For example, since one camera focuses on a subject and the other camera shoots a background, the dual camera may provide an effect of widening a camera viewing angle (for example, the wide angle effect). The electronic device may use more cameras according to necessary performance and configuration, in addition to the dual camera including two cameras.

In the case of the dual camera, for example, the dual camera may include two or more image sensors for a single lens, or may include two or more pairs of lenses and image sensors (for example, two lenses and two image sensors), with each pair including one lens and one image sensor. The two or more lenses may be configured to have the same viewing angle/aperture, or may be configured to have different viewing angles/apertures. In addition, the two or more image sensors may use not only image sensors of RGB Bayer pattern employing primary color filters, but also image sensors using RGB-IR (for example, an image sensor adding a color filter enabling to see an IR band, in addition to the RGB Bayer pattern), monochrome or complementary color filters.

When there are a plurality of image sensors, each image sensor should apply a changed shooting parameter at the same time as the other image sensors every time the shooting parameter is changed. For example, the respective image sensors may shoot with a time gap to implement a function like wide dynamic range, but, when post-processing is performed with respect to images shot by using the plurality of image sensors, it should be assumed that most of the image sensors shoot at the same time, and various methods for shooting at the same time are introduced.

DISCLOSURE OF INVENTION

Technical Problem

To obtain images from the plurality of image sensors at the same time, power should be applied to all of the image sensors at the same time, and also, a shooting parameter should be set at the same time and shooting should be performed at the same time. However, even if power is supplied at the same time, it may be very difficult to set a shooting parameter and to shoot at the same time. Considering that operation speeds are not completely the same according to hardware of the image sensors, it is almost impossible to obtain images from the plurality of image sensors at the same time due to a system problem in the electronic device, even before considering other factors.

For example, when a shooting parameter is set in software and the image sensors are controlled according to the set shooting parameter, the shooting parameter may be changed to a sensor-dedicated operation parameter (for example, an exposure counter according to clock, a frame counter, a gain, etc.) that may be interpreted by the image sensors, and may be converted into an electric signal through a communication channel (for example, an inter integrated circuit (I2C)) connected to the image sensor through middleware/kernel driver, and may be transmitted to the respective image sensors.

For example, in the case of an Android system, if a shooting parameter is determined and is reflected in an application running on an Android runtime (for example, Dalvik VM or Art VM), a method for interpreting a shooting condition at a native library and converting the parameter into a sensor-dedicated operation parameter may be invoked. The converted operation parameter may go through a complicated step to be output to a physical interface connected with the image sensor through a hardware abstraction layer and a linux kernel driver. In particular, if the plurality of image sensors are connected to one physical interface (for example, one channel), the shooting parameter is set in the respective image sensors in sequence and thus much time may be required. To reduce the required time, the respective image sensors may be assigned respective channels and may use the channels. However, in this case, the shooting parameter may not be transmitted to the respective image sensors at the same time due to problems of a processing priority of an operating system, interrupt, a time difference in transmitting through middleware/kernel driver. In addition, if the plurality of image sensors have different standards (or performance), calculations performed when the shooting parameter is changed may be different, and an amount of parameter that should be transmitted may be different. Therefore, it may be impossible for the different image sensors to shoot images at the same time.

Various embodiments may provide a method and an apparatus for controlling parameter information for shooting to be reflected at the same time in a plurality of image sensors.

Solution to Problem

According to various embodiments, an electronic device includes: a first image sensor; a second image sensor electrically connected with the first image sensor through a designated interface; and a processor, wherein the processor is configured to: determine parameter information for controlling the first image sensor and the second image sensor regarding shooting; and transmit the determined parameter information to the first image sensor and the second image sensor, wherein the first image sensor is configured to transmit a reflection signal to the second image sensor through the designated interface to cause the second image sensor to use the parameter information in response to the reflection signal.

According to various embodiments, an electronic device includes: a first image sensor; a second image sensor; and a processor connected with the first image sensor and the second image sensor through a designated interface, wherein the processor is configured to: determine parameter information for controlling the first image sensor and the second image sensor regarding shooting; transmit the determined parameter information to the first image sensor and the second image sensor; and transmit a reflection signal to the first image sensor and the second image sensor to cause the first image sensor and the second image sensor to use the parameter information in response to the reflection signal transmitted through the designated interface.

According to various embodiments, an electronic device includes: a first image sensor; a second image sensor electrically connected with the first image sensor through a first interface; and a processor including a second interface connected with the first image sensor, wherein the processor is configured to: determine parameter information for controlling the first image sensor and the second image sensor regarding shooting; transmit the determined parameter information to the first image sensor and the second image sensor; and transmit a reflection signal for use of the parameter information through the second interface, wherein the first image sensor is configured to receive the reflection signal from the processor through the second interface, and to transmit the reflection signal to the second image sensor through the first interface to cause the second image sensor to use the parameter information in response to the reflection signal.

Advantageous Effects of Invention

According to various embodiments, the processor transmits parameter information to a plurality of image sensors, and the processor or a master image sensor transmits a control signal to reflect the parameter information to the other image sensors, such that the parameter information can be reflected at the plurality of image sensors at the same time.

According to various embodiments, an image shot at the plurality of image sensors at the same time can be obtained.

According to various embodiments, operations necessary for providing an added value or an effect (depth map, live focus, Bokeh, etc.) to an image obtained by a camera module in which a viewing angle, configuration, position of a lens is different, and types, resolutions, etc. of color filters of image sensors are differently configured can be reduced.

According to various embodiments, operations necessary for reflecting parameter information can be reduced, and thus heat emission of an electronic device can be reduced and a processing speed can be enhanced.

BEST MODE FOR EMBODYING THE INVENTION

Figure 1:
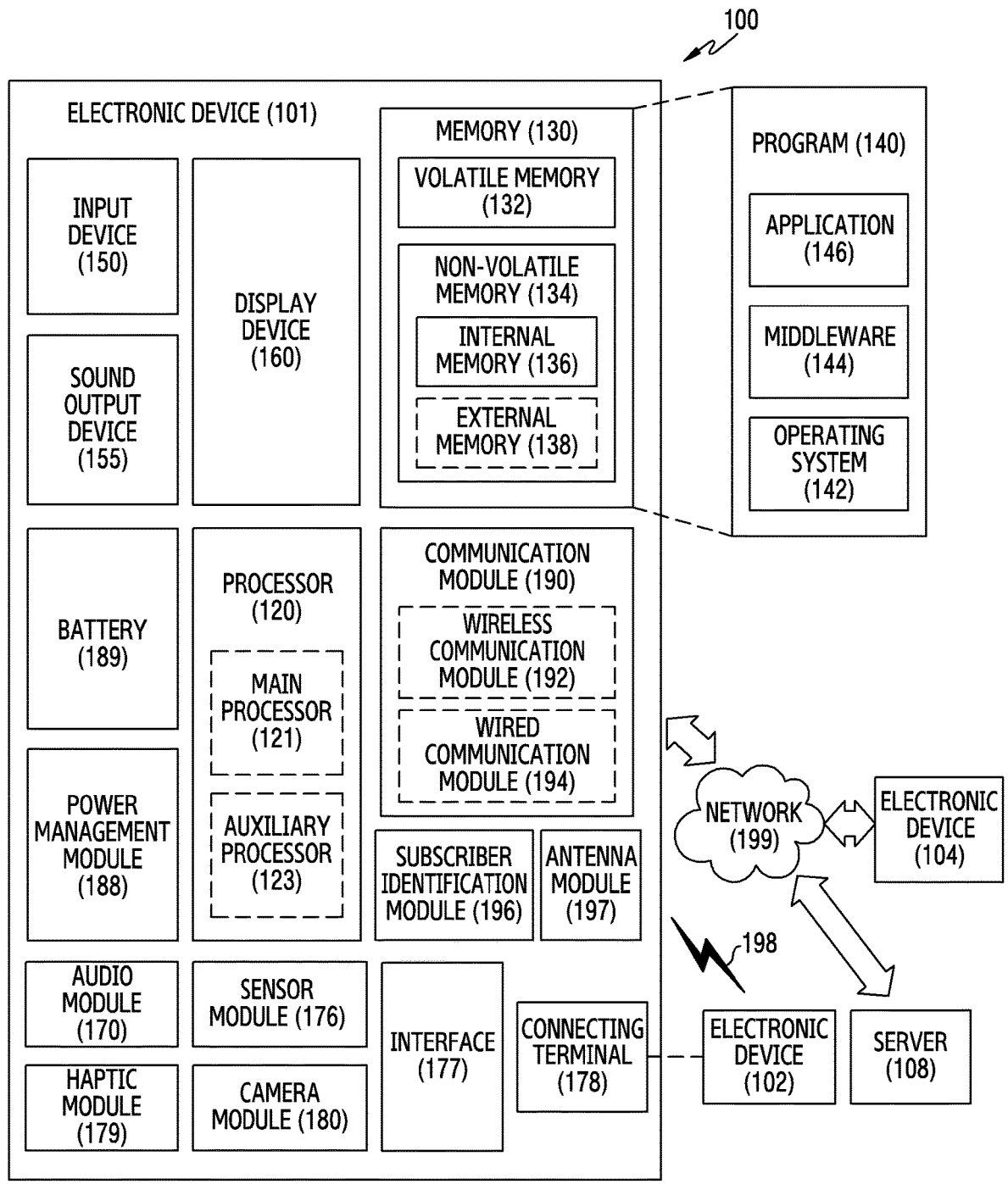
FIG. 1 is a block diagram of an electronic device in a network environment according to various embodiments.

Various embodiments of the disclosure are mentioned below with reference to the accompanying drawings. However, various embodiments and the terms used in various embodiments do not intend to limit a technology mentioned in the disclosure to a specific embodiment form, and should be understood as including various modifications, equivalents and/or alternatives of various embodiments. With regard to a description of the drawings, like reference numerals may be used to refer like components. And, an embodiment disclosed in the disclosure has been suggested for explanation and understanding of the technology disclosed, and does not limit the scope of the technology mentioned in the disclosure. Accordingly, the scope of the disclosure should be interpreted as including all changes or various other embodiments that are based on the technological spirit of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
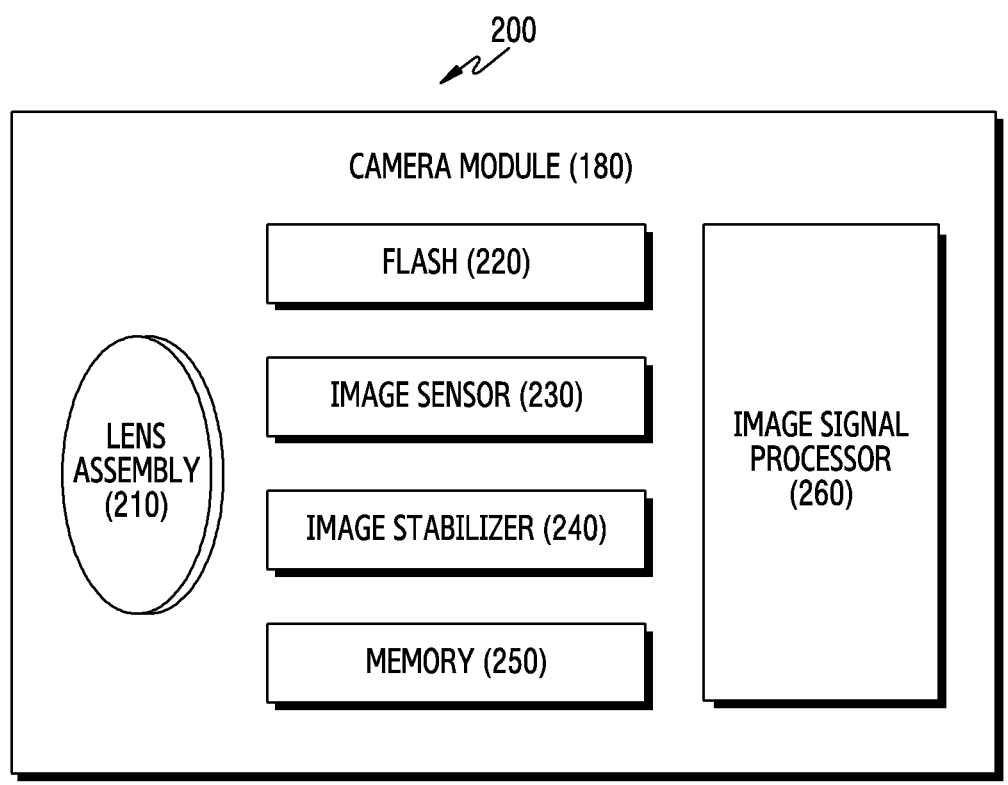
FIG. 2 is a block diagram 200 of a camera module 180 according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may be, for example, a dual camera, a 360-degree camera, or a spherical camera. the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented as, for example, a charged coupled device (CCD) sensor or a complementary metal oxide semiconductor (CMOS) sensor.

The image stabilizer 240 may move or control (e.g., adjust the read-out timing) the image sensor 230 or at least one lens included in the lens assembly 210 in a particular direction of the image sensor 230 in response to the movement of the camera module 180 or the electronic device 101 including the camera module 180 for compensating for at least part of a negative effect (e.g., image blurring) by the movement on an image being captured. According to an embodiment, the image stabilizer 240 may be implemented, for example, as an optical image stabilizer, and may sense the movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening)) with respect to an image obtained via the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180.

An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, images processed by the image signal processor 260 may be displayed, by the processor 120, via the display device 160 as it is or after being further processed.

According to an embodiment, the electronic device 101 may include two or more camera modules 180 having different attributes or functions. In such a case, at least one camera module may be, for example, a wide-angle camera or a front camera and at least another camera module may be a telephoto camera or a rear camera. Alternatively depending on a mechanical configuration, one or more modules serve as a front camera and a rear camera.

Figure 3:
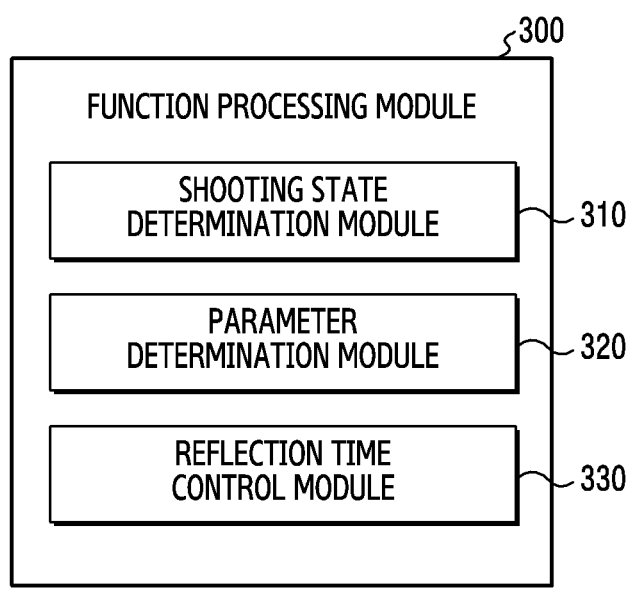
FIG. 3 is a view illustrating an example of a function processing module in an electronic device according to various embodiments.

FIG. 3 is a view illustrating an example of a function processing module in an electronic device according to various embodiments.

Referring to FIG. 3, an example of a function processing module 300 related to determining parameter information for shooting in an electronic device (for example, the electronic device 101 of FIG. 1), and transmitting the determined parameter information to a plurality of image sensors is illustrated. In various embodiments, the function processing module 300 may be included in a processor (for example, the processor 120 of FIG. 1) including a processing circuitry as a hardware module or a software module.

The function processing module 300 may process operations of determining parameter information for shooting, and transmitting the determined parameter information to the plurality of image sensors. In addition, the function processing module 300 may process an operation of transmitting a reflection signal to reflect (or use) parameter information to the plurality of image sensors or a master image sensor (for example, a first image sensor). To achieve this, the function processing module 300 may include a shooting state determination module 310, a parameter determination module 320, or a reflection time control module 330.

The shooting state determination module 310 may detect whether the camera module 180 of the electronic device 101 is operated. For example, when a user executes a camera application installed in the electronic device 101, the shooting state determination module 310 may determine that the camera module 180 is operated. Alternatively, when the user selects a camera function in an executed application while executing the application (for example, a message (or messenger) application, a web page application), the shooting state determination module 310 may determine that the camera module 180 is operated.

The parameter determination module 320 may determine a parameter of an image sensor (for example, the image sensor 230) included in the electronic device 101. The parameter determination module 320 according to various embodiments may determine parameter information, based on at least one of setting of the user, a state of the electronic device 101, a shooting mode set in the electronic device 101, a characteristic (or type) of the image sensor 230, or whether the image sensor 230 is operated or not. The user may change the parameter of the image sensor 230 by selecting a button (or key) related to the camera function which is displayed on a display (for example, the display device 160) of the electronic device 101. The state of the electronic device 101 may be related to a surrounding environment (or situation), and may indicate whether the environment is dark or bright. The shooting mode may include various modes such as an auto mode, a portrait mode, a landscape mode, a panorama mode, a surround mode, or a night shooting mode. The characteristic of the image sensor 230 may vary according to a shooting method of the image sensor 230 (for example, a charge coupled device (CCD), a complementary metal oxide semiconductor (CMOS)), an operation speed, the number of pixels, hardware, or performance. When there are a plurality of image sensors 230, only one image sensor may be used, only some of the image sensors (for example, only three or two image sensors), or all of the image sensors may be used according to setting of the user or setting of the electronic device 101. The parameter information may include at least one of a shutter speed, an aperture, international organization for standardization (ISO) (sensitivity), an exposure time (or an exposure value), a frame counter, a white balance, a magnification, or a gain.

The parameter determination module 320 may change (or determine) the parameter information of the image sensor 230 in real time. The parameter determination module 320 may transmit the determined parameter information to the image sensor 230. When there are the plurality of image sensors 230, the parameter determination module 320 according to various embodiments may determine parameter information for each image sensor. For example, the parameter determination module 320 may determine first parameter information for a first image sensor, and may transmit the determined first parameter information to the first image sensor. In addition, the parameter determination module 320 may determine second parameter information for a second image sensor, and may transmit the determined second parameter information to the second image sensor. The parameter determination module 320 may determine parameter information for two image sensors at the same time or in sequence, and may transmit the parameter information at the same time or in sequence.

When the parameter of the image sensor 230 is changed, the reflection time control module 330 may control a time to reflect the changed parameter information on the image sensor 230. For example, when there are the plurality of image sensors 230, a time at which each image sensor receives the changed parameter information or a time at which each image sensor reflects the changed parameter may be different according to performance of the electronic device 101, performance of each image sensor, or a degree of load of the processor 120. When the parameter information is reflected at different times, there may be a problem in synthesizing (or processing) images shot by the two image sensors into one image. For example, when two images shot at different times are synthesized into one image, there may be a phenomenon that an object (for example, a person) included in the synthesized image appears to overlap. The reflection time control module 330 may transmit a reflection signal including the parameter information reflection time to the image sensor 230 after the parameter information is transmitted.

When there are the plurality of image sensors 230, the image sensors may receive the parameter information at different times according to performance of the electronic device 101 (for example, a system internal configuration) or performance of the image sensors. For example, the first image sensor may receive the first parameter information at the N-th (N is a natural number) frame, and the second image sensor may receive the second parameter information at the N+1-th frame. The reflection time control module 330 may transmit the reflection signal to the image sensor 230 after the parameter information is transmitted, in order to make the times to reflect (or use) the parameter information coincide with one another although the image sensors receive the parameter information at different times. For example, when the parameter information is transmitted at the N-th frame, the reflection time control module 330 may transmit the reflection signal at the N+1-th frame, such that the first image sensor and the second image sensor reflect the parameter information at the N+2-th frame.

Figure 4A:
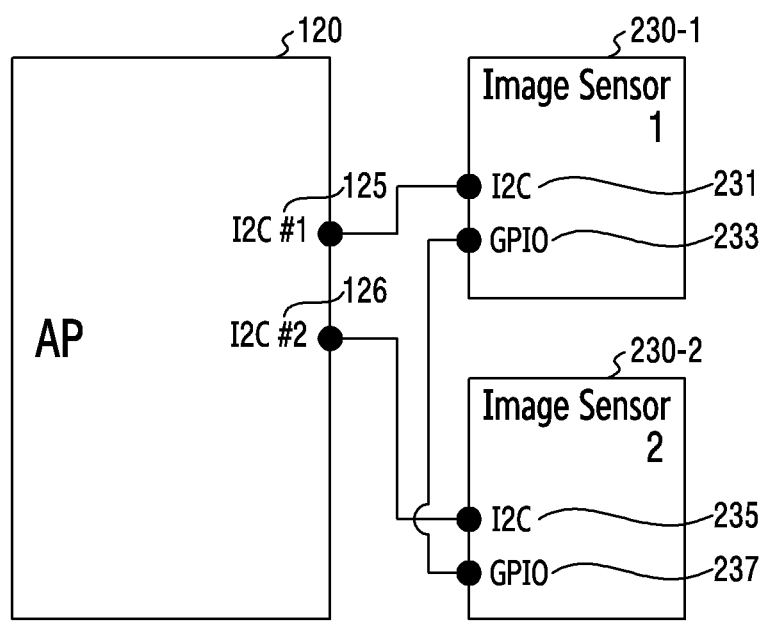
FIGS. 4A to 4C are views illustrating configurations of a processor and a plurality of image sensors according to various embodiments.
Figure 4B:
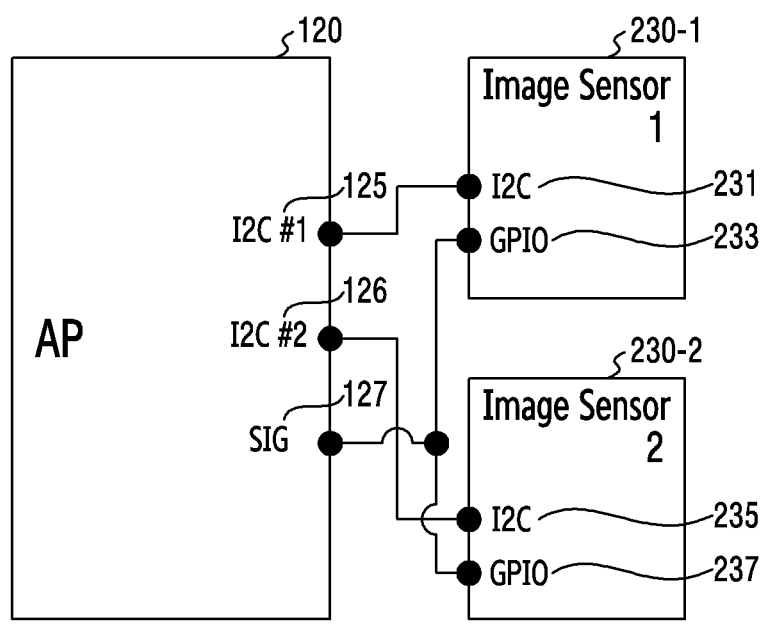
Figure 4C:
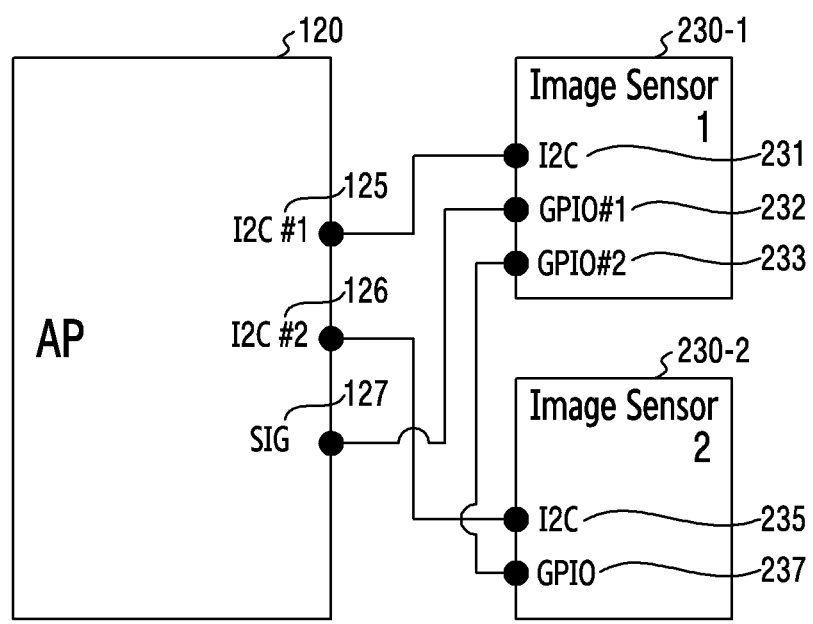

FIGS. 4A to 4C are views illustrating configurations of a processor and a plurality of image sensors according to various embodiments.

FIG. 4A illustrates a configuration in which the processor 120 transmits parameter information to a plurality of image sensors 230-1, 230-2, and a first image sensor (or a master image sensor) 230-1 of the plurality of image sensors 230-1, 230-2 transmits a reflection signal including a parameter information reflection time to a second image sensor (or a slave image sensor) 230-2.

Referring to FIG. 4A, the processor 120 of the electronic device 101 may include a first interface 125 connected with the first image sensor 230-1, and a second interface 126 connected with the second image sensor 230-2. Herein, the first interface 125 (hereinafter, referred to as a "first I2C channel") and the second interface 126 (hereinafter, referred to as a "second I2C channel") may refer to inter integrated circuit (I2C) pins (or I2C channels).

In an embodiment, the I2C channel may be used to transmit a parameter, but other communication interfaces including a serial peripheral interface (SPI) may be used in addition to the I2C according to a specification or a hardware structure of the image sensor. The processor 120 may determine parameter information for each of the plurality of image sensors 230-1, 230-2, and may transmit the determined parameter information. The parameter information may be determined in response to each image sensor. For example, the processor 120 may transmit first parameter information to the first image sensor 230-1 through the first I2C channel 125, and may transmit second parameter information to the second image sensor 230-2 through the second I2C channel 126.

The first image sensor 230-1 may include an I2C channel 231 connected with the processor 120, and a general-purpose input output (GPIO) 233 connected with the second image sensor 230-2. In an embodiment, a GPIO port is used, but a port that is not used during simultaneous operations may be used as a port for transmitting the reflection signal, or a dedicated port for transmitting the reflection signal may be added and used according to a specification or a hardware structure of the image sensor. This is equally applied to other embodiments.

The first image sensor 230-1 may receive the first parameter information from the processor 120 through the I2C channel 231. After receiving the first parameter information, the first image sensor 230-1 may transmit a reflection signal instructing to reflect the second parameter information to the second image sensor 230-2. For example, the first image sensor 230-1 may transmit the reflection signal to the second image sensor 230-2 through the GPIO 233. The first image sensor 230-1 may reflect the first parameter information after (or at the same time as) transmitting the reflection signal.

The second image sensor 230-2 may include an I2C channel 235 connected with the processor 120, and a GPIO 237 connected with the first image sensor 230-1. The second image sensor 230-2 may receive the second parameter information from the processor 120 through the I2C channel 235. When the second image sensor 230-2 receives the reflection signal from the first image sensor 230-1 through the GPIO 237, the second image sensor 230-2 may reflect the second parameter information. After receiving the second parameter information, the second image sensor 230-2 may wait until the reflection signal is received, and, when the reflection signal is received, may reflect the second parameter information.

According to a related-art method, when the processor transmits parameter information to a plurality of image sensors, the plurality of image sensors may reflect the parameter information as soon as they receive the parameter information. Therefore, when the image sensors receive the parameter information at different times, the parameter information may be reflected at different times. However, when the configuration shown in FIG. 4A is implemented, the processor 120 may only transmit the parameter information, and then, the first image sensor 230-1 may transmit the reflection signal to instruct to reflect the parameter information to the second image sensor 230-2. In this case, even when the first image sensor 230-1 and the second image sensor 230-2 receive the parameter information at different times, the parameter information is reflected after the first image sensor 230-1 transmits the reflection signal, such that the first image sensor 230-1 and the second image sensor 230-2 can reflect the parameter information at the same time without a time gap.

FIG. 4B is a view illustrating a configuration in which the processor 120 transmits parameter information to the plurality of image sensors 230-1, 230-2, and then, transmits a reflection signal including a parameter information reflection time to the plurality of image sensors 230-1, 230-2.

Referring to FIG. 4B, the processor 120 of the electronic device 101 may include the first I2C channel 125 connected with the first image sensor 230-1, the second I2C channel 126 connected with the second image sensor 230-2, and a signal line (SIG) 127 to transmit a reflection signal to the first image sensor 230-1 and the second image sensor 230-2. The processor 120 is not required to separately use a dedicated port to transmit the parameter information or the reflection signal to the first image sensor 230-1 and the second image sensor 230-2, and may use an existing GPIO port or may exclusively use a port that is used for other purposes but is not used when the image sensor is operated.

The processor 120 may determine parameter information for each of the plurality of image sensors 230-1, 230-2, and may transmit the determined parameter information. The parameter information may be determined in response to each image sensor. For example, the processor 120 may transmit first parameter information to the first image sensor 230-1 through the first I2C channel 125, and may transmit second parameter information to the second image sensor 230-2 through the second I2C channel 126. Thereafter, the processor 120 may transmit a reflection signal instructing to reflect the first parameter information and the second parameter information to the plurality of image sensors 230-1, 230-2 through the signal line 127.

For example, when the processor 120 transmits parameter information at the N-th frame, a time at which the parameter information is actually reflected may be the next frame (N+1) or the frame (N+2) after the next frame after the parameter information is received. Even if the first image sensor 230-1 and the second image sensor 230-2 receive the parameter information at different times through the I2C channel (for example, the I2C channel 231 or the I2C channel 235), when the processor 120 transmits the reflection signal after a float time enough to consider that the parameter information is transmitted to the plurality of image sensors 230-1, 230-2 is elapsed, the parameter information may be reflected just at the time that the reflection signal is received. The parameter information transmitted through the I2C channel (for example, the first I2C channel 125, the second I2C channel 126) may be transmitted at different times due to an internal system problem of the electronic device 101. In addition, the parameter information contains more data than the reflection signal, and there may be a delay in transmitting the parameter information. However, the reflection signal has a simple value such as 0 (inactive or low) or 1 (active or high) like a clock signal, and may be transmitted without a delay.

In the case of an android system, for example, when a round trip test performed to measure performance of an audio, which has a similar structure as a camera system in the android system, is performed, a delay speed may be 91 ms. The round trip test is a test for measuring a time taken to output a voice signal through a speaker (for example, the sound output device 155) of the electronic device 101 after a voice signal is inputted to a microphone of the electronic device 101. However, when a shooting parameter is transmitted to the plurality of image sensors 230-1, 230-2 from the processor 120, a path corresponding to a half of the path through which signals pass in the round trip test of the audio, that is, a path from the processor 120 to the output device (for example, the speaker), is required, and thus it may be estimated that substantially a half of the time is required. Accordingly, the float time may be calculated based on a time taken for a signal to be transmitted to an output queue of the I2C channel (the first I2C channel 125, the second I2C channel 126), and a time taken for the signal to be output from the output queue. For example, when it is assumed that the time taken to be transmitted to the output queue is a half of 91 ms which is derived from the audio round trip test, 45.5 ms, and an operation is performed at 390 kHz, an output time of about 0.11 ms is required for each line. Accordingly, the processor 120 may calculate an optimal float time based on characteristics of the plurality of image sensors 230-1, 230-2, a hardware configuration and performance of the electronic device 101.

For example, when the first parameter information arrives at the output queue of the I2C channel (for example, the first I2C channel 125, the second I2C channel 126) at the same time without a time gap, and image sensors each requiring only one line in setting an integration time, a frame length line, an analog gain without a waiting time in the transmission queue of the I2C channel are connected to separate I2C channels (for example, the I2C channel 231, the I2C 235) having their respective transmission queues, and are driven, a minimum time required for the parameter information to arrive at the image sensor may be 45.83 ms. If the transmission queue is shared, a minimum time required for the parameter information to arrive at the image sensor may be 46.16 ms. The delay time of 46.16 ms in the image sensor operating at 30 fps may correspond to a time as long as 1.38 frames. Accordingly, the processor 120 may determine a time to transmit the reflection signal by considering the float time. The processor 120 may change the address of the signal line 127 to control the reflection signal to be transmitted to the first image sensor 230-1 and the second image sensor 230-2, respectively. Examples of the audio-related delay time of the android system or the float time are just provided for easy understanding of the present disclosure, and the present disclosure is not limited by the descriptions provided above.

The first image sensor 230-1 may include the I2C channel 231 connected with the processor 120, and the GPIO 233 connected with the processor 120. The first image sensor 230-1 may receive the first parameter information through the I2C channel 231. In addition, the first image sensor 230-1 may receive the reflection signal instructing to reflect the first parameter information from the processor 120 through the GPIO 233. When the first image sensor 230-1 receives the reflection signal, the first image sensor 230-1 may reflect the first parameter information.

The second image sensor 230-2 may include the I2C channel 235 connected with the processor 120, and the GPIO 237 connected with the processor 120. The second image sensor 230-2 may receive the second parameter information from the processor 120 through the I2C channel 235. In addition, the second image sensor 230-2 may receive the reflection signal instructing to reflect the second parameter information from the processor 120 through the GPIO 237. When the second image sensor 230-2 receives the reflection signal, the second image sensor 230-2 may reflect the second parameter information.

FIG. 4C is a view illustrating a configuration in which the processor 120 transmits parameter information and a reflection signal to reflect the parameter information to the plurality of image sensors 230-1, 230-2, and the first image sensor 230-1 from among the plurality of image sensors 230-1, 230-2 determines a time to reflect the parameter information, and transmits the reflection signal including the reflection time to the second image sensor 230-2.

Referring to FIG. 4C, the processor 120 of the electronic device 101 may include the first I2C channel 125 connected with the first image sensor 230-1, the second I2C channel 126 connected with the second image sensor 230-2, and the signal line (SIG) 127 to transmit a reflection signal to the first image sensor 230-1. For example, the processor 120 may transmit first parameter information to the first image sensor 230-1 through the first I2C channel 125, and may transmit second parameter information to the second image sensor 230-2 through the second I2C channel 126. Thereafter, the processor 120 may transmit a reflection signal instructing to reflect the first parameter information to the first image sensor 230-1 through the signal line 127. The processor 120 has only to transmit the reflection signal to the first image sensor 230-1 and thus its workload can be reduced.

The first image sensor 230-1 may include the I2C channel 231 connected with the processor 120, a first GPIO 232 connected with the processor 120, and a second GPIO 233 connected with the second image sensor 230-2. The first image sensor 230-1 may receive the first parameter information from the processor 120 through the I2C channel 231. The first image sensor 230-1 may receive the reflection signal instructing to reflect the first parameter information from the processor 120 through the first GPIO 232. When the first image sensor 230-1 receives the reflection signal, the first image sensor 230-1 may determine when to transmit the received reflection signal to the second image sensor 230-2.

The first image sensor 230-1 may further include a micro controller unit (MCU) which is not shown, and the MCU may determine a time to transmit the reflection signal to the second image sensor 230-2. The first image sensor 230-1 may determine the time to transmit the reflection signal, based on a delay time at which the second parameter information is transmitted to the second image sensor 230-2. If the first image sensor 230-1 and the second image sensor 230-2 are sensors of different types (or even if the first image sensor 230-1 and the second image sensor 230-2 are sensors of the same type), they may receive the first parameter information and the second parameter information at different times. In this case, after a predetermined time (for example, after two frames) after receiving the reflection signal, the first image sensor 230-1 may transmit the reflection signal to the second image sensor 230-2 through the second GPIO 233. The first image sensor 230-1 may reflect the first parameter information after (or at the same time as) transmitting the reflection signal.

The second image sensor 230-2 may include the I2C channel 235 connected with the processor 120, and the GPIO 237 connected with the first image sensor 230-1. The second image sensor 230-2 may receive the second parameter information from the processor 120 through the I2C channel 235. The second image sensor 230-2 may reflect the second parameter information when receiving the reflection signal from the first image sensor 230-1 through the GPIO 237. After receiving the second parameter information, the second image sensor 230-2 may wait until the reflection signal is received, and then, when the reflection signal is received, may reflect the second parameter information.

Although FIGS. 4A to 4C illustrate that the processor 120 individually uses the channels I2C communicating with the respective image sensors (for example, the first I2C channel 125 communicating with the first image sensor 230-1, the second I2C channel 126 communicating with the second image sensor 230-2), the processor 120 may include one I2C channel For example, the processor 120 may use one physically Y-shaped I2C channel (for example, in a state in which one I2C channel of the processor 120, the I2C channel 231 of the first image sensor 230-1, and the I2C channel 235 of the second image sensor 230-2 are connected with one another), but may change the address to distinguish the image sensors from one another.

Although two image sensors are illustrated in the drawings, the electronic device 101 may include two or more image sensors. One image sensor of the plurality of image sensors may be a "master image sensor," and the other image sensors may be "slave image sensors." The slave image sensor may receive parameter information from the processor 120, and may receive a reflection signal from the processor 120 or the master image sensor. Alternatively, the image sensors may include a plurality of "master image sensors" and a plurality of "slave image sensors" subordinate to each "master image sensor."

The electronic device 101 according to various embodiments may include the first image sensor 230-1, the second image sensor 230-2 electrically connected with the first image sensor through a designated interface (for example, the GPIO 237); and the processor 120, and the processor may be configured to: determine parameter information for controlling the first image sensor and the second image sensor regarding shooting; and transmit the determined parameter information to the first image sensor and the second image sensor, and the first image sensor may be configured to transmit a reflection signal to the second image sensor through the designated interface to cause the second image sensor to use the parameter information in response to the reflection signal.

The processor may be configured to: determine first parameter information corresponding to the first image sensor, and to determine second parameter information corresponding to the second image sensor; and to transmit the first parameter information to the first image sensor, and to transmit the second parameter information to the second image sensor.

The first image sensor may be configured to transmit the reflection signal to the second image sensor after receiving the parameter information.

The second image sensor may be configured to receive the parameter information, and to delay an operation of using the parameter information until the reflection signal is received.

The first image sensor may be configured to reflect the parameter information after transmitting the reflection signal.

The electronic device 101 according to various embodiments may include the first image sensor 230-1, the second image sensor 230-2, and the processor 120 connected with the first image sensor and the second image sensor through a designated interface, and the processor may be configured to: determine parameter information for controlling the first image sensor and the second image sensor regarding shooting; transmit the determined parameter information to the first image sensor and the second image sensor; and transmit a reflection signal to the first image sensor and the second image sensor to cause the first image sensor and the second image sensor to use the parameter information in response to the reflection signal transmitted through the designated interface.

The processor may be configured to transmit the reflection signal through the designated interface after transmitting the parameter information.

The first image sensor and the second image sensor may be configured to reflect the parameter information when the reflection signal is received.

The processor may be configured to calculate a time to transmit the reflection signal, based on characteristics of the first image sensor and the second image sensor, a hardware configuration and performance of the electronic device.

The processor may be configured to calculate a float time based on a time taken for the parameter information to be transmitted to an output queue of an inter integrated circuit (I2C) channel, and a time taken for the parameter information to be outputted from the output queue, and to transmit the reflection signal after the float time.

The processor may be configured to determine the parameter information in real time by an operation of a camera module.

The processor may be configured to determine the parameter information, based on at least one of setting of a user, a state of the electronic device, a shooting mode set in the electronic device, characteristics of the first image sensor and the second image sensor, or whether the first image sensor and the second image sensor are operated.

The electronic device 101 according to various embodiments may include the first image sensor 230-1, the second image sensor 230-2 electrically connected with the first image sensor through a first interface (for example, the GPIO 237); and the processor 120 include a second interface (for example, the signal line 127) connected with the first image sensor, and the processor may be configured to: determine parameter information for controlling the first image sensor and the second image sensor regarding shooting; transmit the determined parameter information to the first image sensor and the second image sensor; and transmit a reflection signal for use of the parameter information through the second interface, and the first image sensor may be configured to receive the reflection signal from the processor through the second interface, and to transmit the reflection signal to the second image sensor through the first interface to cause the second image sensor to use the parameter information in response to the reflection signal.

The first image sensor may be configured to determine a time to transmit the reflection signal by considering a time taken for the parameter information to be transmitted to the second image sensor.

The first image sensor may be configured to use the parameter information after transmitting the reflection signal.

The second image sensor may be configured to receive the parameter information, and to delay an operation of using the parameter information until the reflection signal is received.

An image sensor (for example, the first image sensor 230-1) according to various embodiments may be connected with an external image sensor (for example, the second image sensor 230-2) through a designated interface, and may be configured to receive parameter information from an external processor (for example, the processor 120), and to transmit a reflection signal to the external image sensor to cause the external image sensor to use the parameter information received from the external sensor in response to the reflection signal.

The image sensor may be configured to transmit the reflection signal to the external image sensor after receiving the parameter information.

The image sensor may be configured to use the parameter information after transmitting the reflection signal.

The image sensor may be configured to determine a time to transmit the reflection signal by considering a time taken for the parameter information to be transmitted to the external image sensor.

Figure 5:
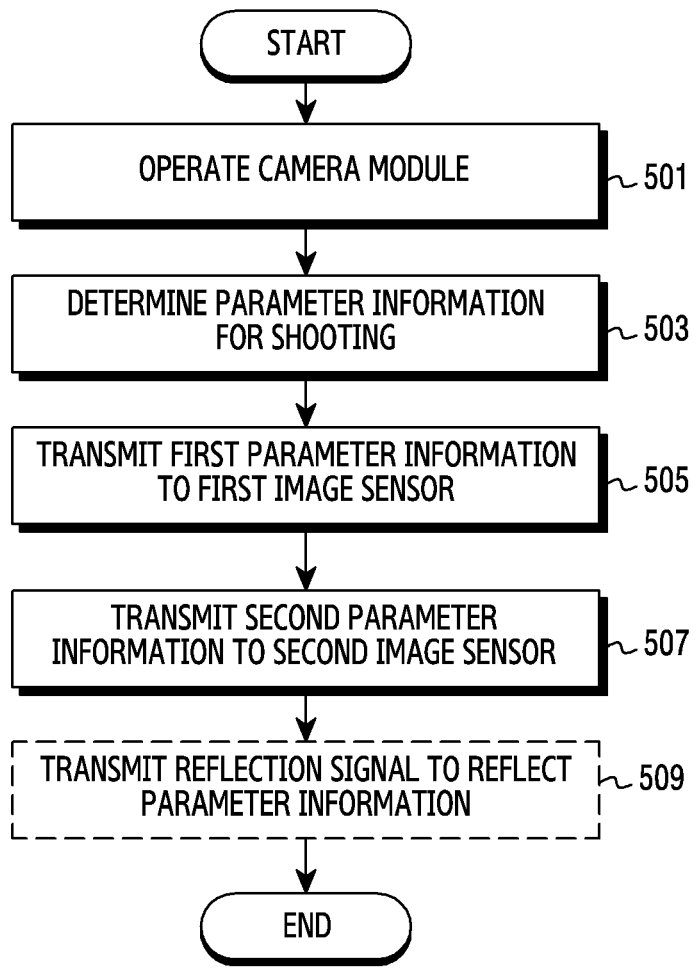
FIG. 5 is a flowchart illustrating a processor operating method of an electronic device according to various embodiments.

FIG. 5 is a flowchart illustrating a processor operating method of an electronic device according to various embodiments.

Referring to FIG. 5, in operation 501, the processor 120 of the electronic device 101 may operate the camera module 180. The processor 120 may operate the camera module 180 based on a user input. For example, when a camera application is selected from a list of applications (for example, a plurality of icons displayed in a home screen) installed in the electronic device 101 (for example, a camera icon is selected), the processor 120 may operate the camera module 180. Alternatively, when a camera function included in an application other than the camera application is selected while the application is being executed, the processor 120 may operate the camera module 180. Alternatively, when a user input related to operating of the camera module 180 (for example, selection of a camera button or a predetermined input) is detected on a lock screen of the electronic device 101, the processor 120 may operate the camera module 180.

When the camera module 180 is operated, an image obtained from the camera module 180 may be displayed on the display device 160 of the electronic device 101 as a preview image. The preview image may refer to displaying the image obtained from the camera module 180 in real time on the display device 160. However, while displaying the preview image or before or after displaying the preview image, the processor 120 may perform operations 503 to 507.

In operation 503, the processor 120 of the electronic device 101 may determine parameter information for shooting. The processor 120 may determine parameter information based on at least one of setting of a user, a state (or a current state) of the electronic device 101, a shooting mode set in the electronic device 101, a characteristic (or type) of the image sensor 230, or whether the image sensor 230 is operated or not. The state of the electronic device 101 may be related to a surrounding environment (or situation), and may indicate whether the environment is dark or bright. The shooting mode may include various modes such as an auto mode, a portrait mode, a landscape mode, a panorama mode, a surround mode, or a night shooting mode. The characteristic of the image sensor 230 may vary according to a shooting method of the image sensor 230 (CCD, CMOS), an operation speed, the number of pixels, hardware, or performance. When there are a plurality of image sensors 230, only one image sensor may be used, only some of the image sensors, or all of the image sensors may be used according to setting of the user or setting of the electronic device 101.

Since the processor 120 determines the parameter information according to a state of the electronic device 101, a shooting mode, characteristic of each image sensor, the parameter information may be different according to a shooting mode even if the image sensors are image sensors of the same type. Alternatively, if the image sensors are image sensors of different types, an amount or a type of data included in the parameter information may be different. The parameter information may include at least one of a shutter speed, an aperture, ISO, an exposure time, a frame counter, a white balance, a magnification, or a gain. In addition, the parameter information may include various types or various values according to a characteristic of the image sensor 230. In addition, the processor 120 may determine (or set) the parameter information in various methods. A method for determining the parameter information corresponds to related-art technology, and thus a detailed description thereof is omitted.

In operation 505, the processor 120 of the electronic device 101 may transmit first parameter information to a first image sensor (for example, the first image sensor 230-1). The first parameter information may be parameter information of the first image sensor 230-1. For example, the processor 120 may transmit the first parameter information to the first image sensor 230-1 through the first I2C channel 125 physically connected with the first image sensor 230-1.

In operation 507, the processor 120 of the electronic device 101 may transmit second parameter information to a second image sensor (for example, the second image sensor 230-2). The second parameter information may be parameter information of the second image sensor 230-2. The second parameter information may be the same as or different from the first parameter information. The processor 120 may transmit the second parameter information to the second image sensor 230-2 through the second I2C channel 126 physically connected with the second image sensor 230-2.

Although operation 505 and operation 507 are illustrated as being distinct from each other, operation 505 and operation 507 may be performed at the same time. Alternatively, the processor 120 may perform operation 507 first, and then may perform operation 505.

In operation 509, the processor 120 of the electronic device 101 may transmit a reflection signal to reflect the parameter information. For example, after transmitting the first parameter information and the second parameter information, respectively, the processor 120 may transmit a reflection signal to reflect the first parameter information to the first image sensor 230-1, and may transmit a reflection signal to reflect the second parameter information to the second image sensor 230-2. To achieve this, the processor 120 may further include the signal line 127 physically connected with the first image sensor 230-1 and the second image sensor 230-2. The processor 120 may transmit the reflection signal to the first image sensor 230-1 through the signal line 127, and may transmit the reflection signal to the second image sensor 230-2 through the signal line 127. For example, the processor 120 may change the address of the signal line 127, and may control the reflection signal to be transmitted to the first image sensor 230-1 and the second image sensor 230-2, respectively. The processor 120 according to various embodiments may transmit the reflection signal only to the first image sensor 230-1 through the signal line 127.

The processor 120 according to various embodiments may calculate a float time based on a time taken for the parameter information to be transmitted to an output queue of the I2C channel (for example, the first I2C channel 125, the second I2C channel 126), and a time taken for the parameter information to be outputted from the output queue. For example, the processor 120 may transmit the reflection signal after the flat time is elapsed after transmitting the parameter information. The processor 120 may calculate an optimum float time, based on characteristics of the plurality of image sensors 230-1, 230-2, and a hardware configuration and performance of the electronic device 101.

Operation 509 may be omitted. For example, the processor 120 may transmit only the parameter information to the plurality of image sensors 230-1, 230-2.

Figure 6:
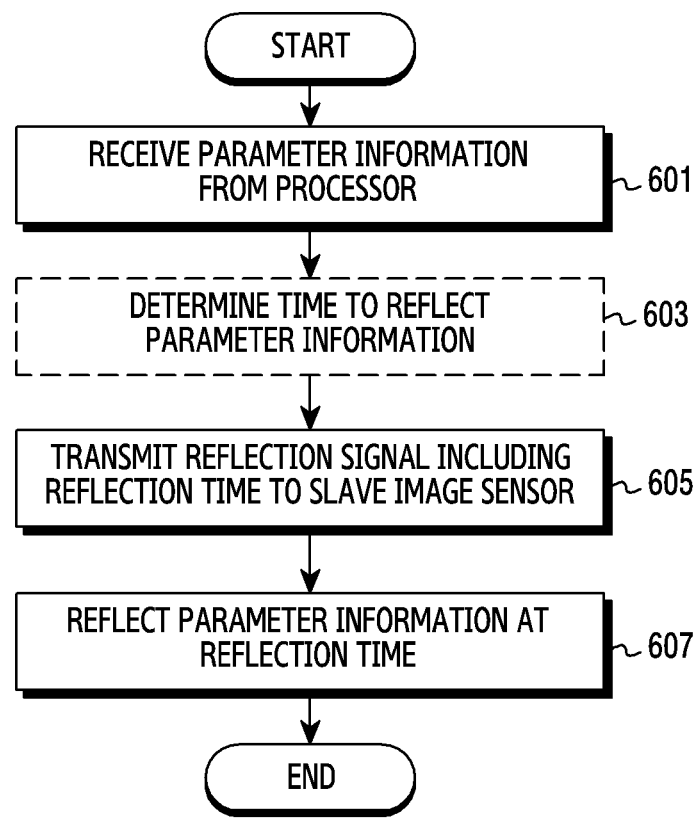
FIGS. 6 and 7 are flowcharts illustrating a master image sensor operating method of an electronic device according to various embodiments.
Figure 7:
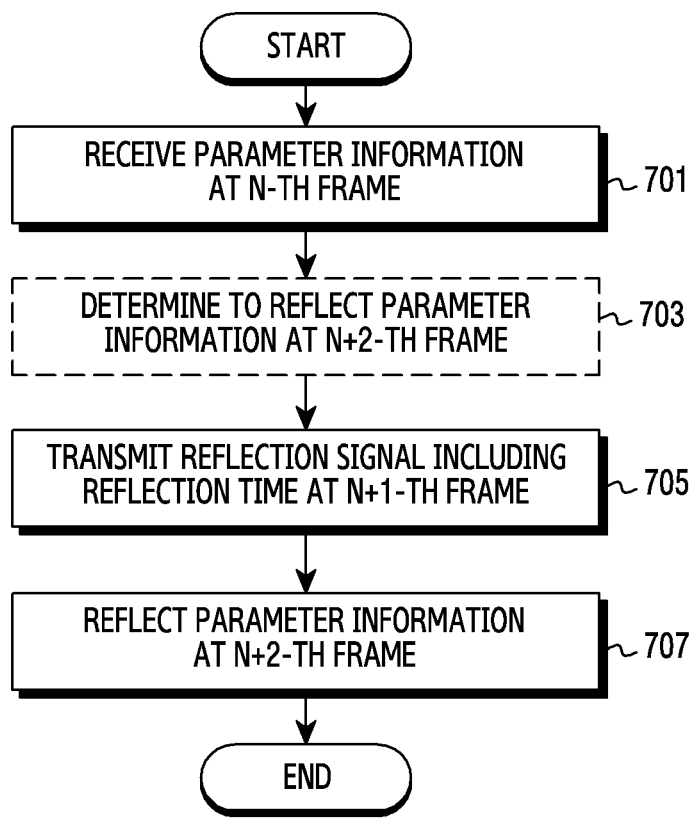

FIGS. 6 and 7 are flowchart illustrating a master image sensor operating method of an electronic device according to various embodiments.

FIG. 6 is a flowchart illustrating an operating method of a master image sensor.

Referring to FIG. 6, in operation 601, the first image sensor 230-1 of the electronic device 101 may receive parameter information (for example, first parameter information) from the processor 120. The first image sensor 230-1 may receive the first parameter information through the I2C channel 231 physically connected with the processor 120.

In operation 603, the first image sensor 230-1 of the electronic device 101 may determine a time to reflect the parameter information. For example, after receiving a reflection signal from the processor 120, a controller (for example, an MCU) of the first image sensor 230-1 may determine a reflection time by considering a time at which second parameter information is transmitted to the second image sensor 230-2. For example, when the first parameter information and the reflection signal are received at the N-th frame, the first image sensor 230-1 may determine the N+1-th frame as the reflection time. However, operation 603 may be omitted. Alternatively, when the reflection signal is received from the processor 120, the first image sensor 230-1 may not perform operation 603 and may perform operation 605.

In operation 605, the first image sensor 230-1 of the electronic device 101 may transmit the reflection signal including the reflection time to a slave image sensor (for example, the second image sensor 230-2). The reflection signal may be generated at the first image sensor 230-1 or may be received from the processor 120. The first image sensor may transmit the reflection signal through the GPIO 233 physically connected with the second image sensor 230-2.

In operation 607, the first image sensor 230-1 of the electronic device 101 may reflect the first parameter information at the reflection time. When the first parameter information is reflected at the first image sensor 230-1, a preview image displayed on the display device 160 of the electronic device 101 may be changed. For example, brightness, sharpness, coloration, etc. of the preview image may be changed.

FIG. 7 is a flowchart illustrating an operating method for each frame in the master image sensor.

Referring to FIG. 7, in operation 701, the first image sensor 230-1 of the electronic device 101 may receive parameter information (for example, first parameter information) from the processor 120 at the N-th frame. The first image sensor 230-1 may receive the first parameter information through the I2C channel 231 at the N-th frame.

In operation 703, the first image sensor 230-1 of the electronic device 101 may determine to reflect the parameter information at the N+2-th frame. For example, the first image sensor 230-1 may receive the first parameter information and a reflection signal at the N-th frame, but the second image sensor 230-2 may receive second parameter information at the N+1-th frame. According to a related-art method, parameter information is reflected as soon as the parameter information is received, and thus the first image sensor 230-1 may reflect the first parameter information at the N+1-th frame, and the second image sensor 230-2 may reflect the second parameter information at the N+2-th frame, and accordingly, there may be a time difference in the N+1-th frame between an image obtained by the second image sensor 230-2 and an image obtained by the first image sensor 230-1.

However, in the present disclosure, even when the first image sensor 320-1 receives the first parameter information at the N-th frame, the first image sensor 230-1 may wait until the second image sensor 230-2 receives the second parameter information, and then, may reflect the first parameter information at the N+2-th frame, such that there is no time difference between images obtained by the first image sensor 230-1 and the second image sensor 230-2 in all of the N-th, N+1-th, N+2-th frames.

However, operation 703 may be omitted. When the reflection signal is received from the processor 120, the first image sensor 230-1 may not perform operation 703 and may perform operation 705.

In operation 705, the first image sensor 230-1 of the electronic device 101 may transmit a reflection signal including the reflection time to the slave image sensor (for example, the second image sensor 230-2) at the N+1-th frame. The reflection signal may be generated at the first image sensor 230-1 or may be received from the processor 120. The first image sensor 230-1 may receive the first parameter information at the N-th frame and may transmit the reflection signal at the N+1-th frame. The first image sensor 230-1 may transmit the reflection signal at the N+1-th frame by considering a delay time taken until the second parameter information is transmitted to the second image sensor 230-2.

In operation 707, the first image sensor 230-1 of the electronic device 101 may reflect the first parameter information at the N+2-th frame. When the first parameter information is reflected at the first image sensor 230-1, a preview image displayed on the display device 160 of the electronic device 101 may be changed, For example, brightness, sharpness, coloration, etc. of the preview image may be changed.

Figure 8:
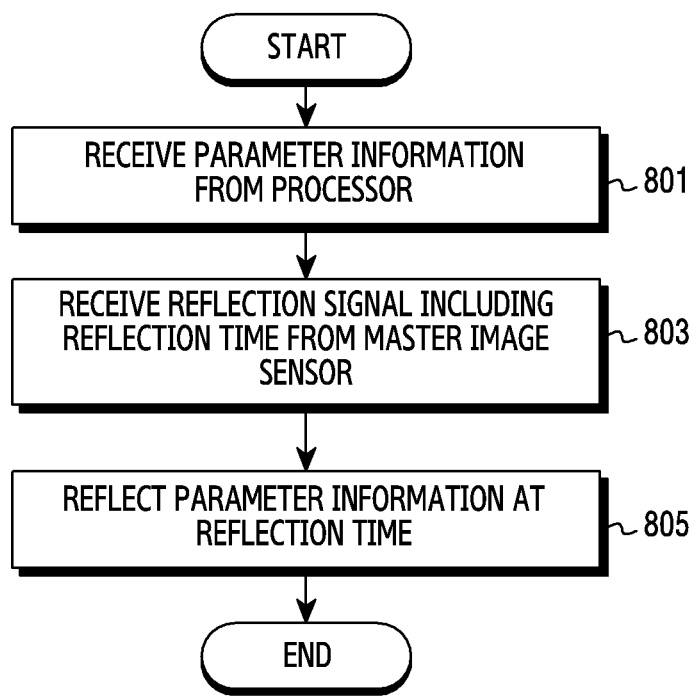
FIG. 8 is a flowchart illustrating a slave image sensor operating method of an electronic device according to various embodiments.

FIG. 8 is a flowchart illustrating a slave image sensor operating method of an electronic device according to various embodiments.

Referring to FIG. 8, in operation 801, the second image sensor 230-2 of the electronic device 101 may receive parameter information (for example, second parameter information) from the processor 120. The second image sensor 230-2 may receive the second parameter information through the I2C channel 235 physically connected with the processor 120.

In operation 803, the second image sensor 230-2 of the electronic device 101 may receive a reflection signal including a reflection time. The reflection signal maybe received from a master image sensor (for example, the first image sensor 230-1) or may be received through the processor 120. For example, the second image sensor 230-2 may receive the reflection signal through the GPIO 237 physically connected with the first image sensor 230-1. Alternatively, the second image sensor 230-2 may receive the reflection signal through the GPIO 237 physically connected with the processor 120.

In operation 805, the second image sensor 230-2 of the electronic device 101 may reflect the second parameter information at the reflection time. When the second image sensor 230-2 reflects the second parameter information, a preview image displayed on the display device 160 of the electronic device 101 may be changed. For example, brightness, sharpness, coloration, etc. of the preview image may be changed.

For example, when the second image sensor 230-2 receives the second parameter information at the N-th frame and receives the reflection signal at the N+1-th frame, the second image sensor 230-2 may reflect the second parameter information at the N+2-th frame. Alternatively, when the second image sensor 230-2 receives the second parameter information and the reflection signal at the N+1-th frame, the second image sensor 230-2 may reflect the second parameter information at the N+2-th frame.

Figure 9:
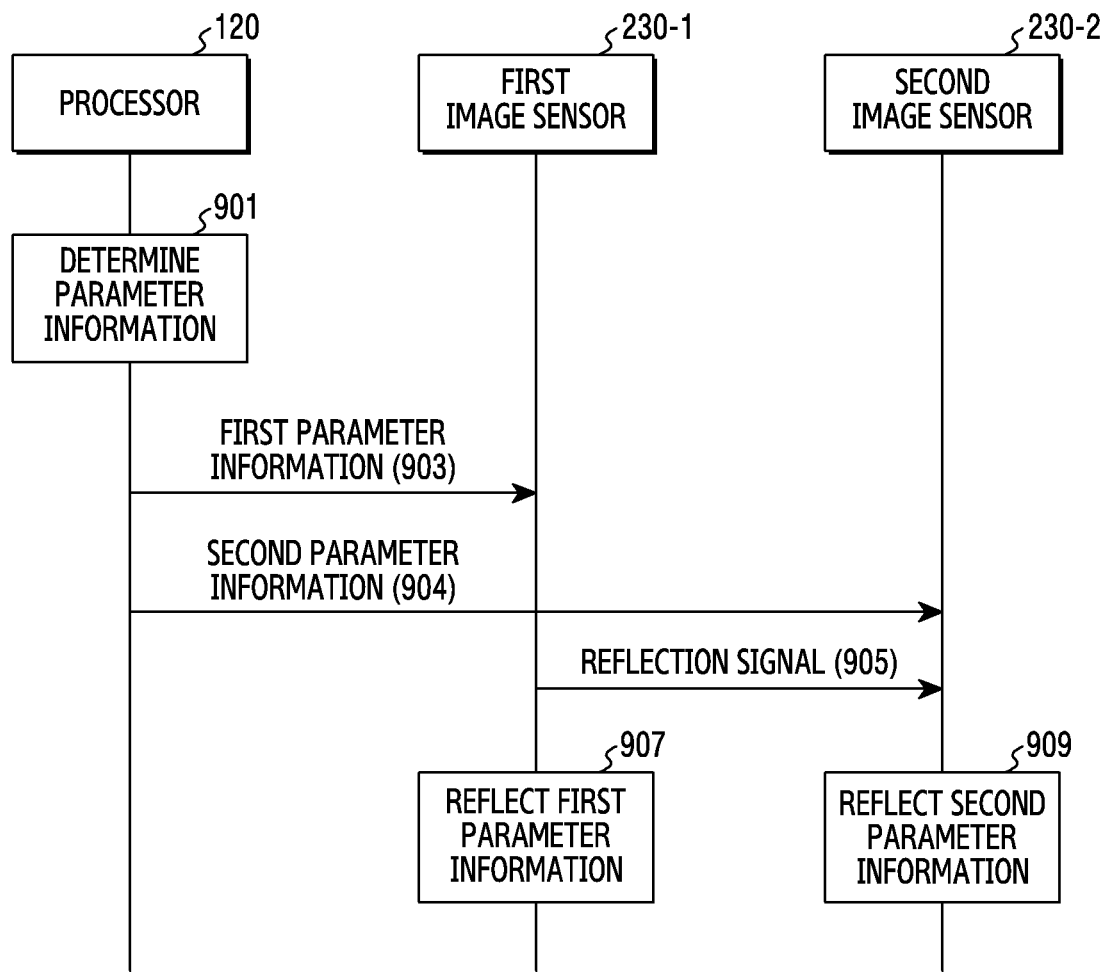
FIG. 9 is a flowchart illustrating an operating method of a processor and a plurality of image sensors according to various embodiments.

FIG. 9 is a flowchart illustrating an operating method of a processor and a plurality of image sensors according to various embodiments.

Referring to FIG. 9, in operation 901, the processor 120 of the electronic device 101 may determine parameter information. For example, the processor 120 may determine first parameter information for the first image sensor 230-1, and may determine second parameter information for the second image sensor 230-2. The first parameter information and the second parameter information may be the same as or different from each other.

In operation 903, the processor 120 of the electronic device 101 may transmit the first parameter information to the first image sensor 230-1. For example, the processor 120 may transmit the first parameter information to the first image sensor 230-1 through the first I2C channel 125.

In operation 904, the processor 120 of the electronic device 101 may transmit the second parameter information to the second image sensor 230-2. For example, the processor 120 may transmit the second parameter information to the second image sensor 230-2 through the second I2C channel 126.

Although it is illustrated that operation 903 and operation 904 are distinct from each other, operation 903 and operation 904 may be performed at the same time. Alternatively, the processor 120 may perform operation 904 first, and may perform operation 903 later.

In operation 905, the first image sensor 230-1 of the electronic device 101 may transmit a reflection signal to the second image sensor 230-2. The first image sensor 230-1 may receive the first parameter information from the processor 120 through the I2C channel 231. The first image sensor 230-1 may transmit the reflection signal after receiving the first parameter information from the processor 120. The first image sensor 230-1 may transmit the reflection signal to the second image sensor 230-2 through the GPIO 233.

In operation 907, the first image sensor 230-1 of the electronic device 101 may reflect the first parameter information. In operation 909, the second image sensor 230-2 of the electronic device 101 may reflect the second parameter information. That is, even when the first image sensor 230-1 and the second image sensor 230-2 receive the parameter information, respectively, at different times, the times at which the parameter is reflected may be synchronized with each other (for example, may be made to coincide with each other) by the reflection signal transmitted by the first image sensor 230-1.

Figure 10:
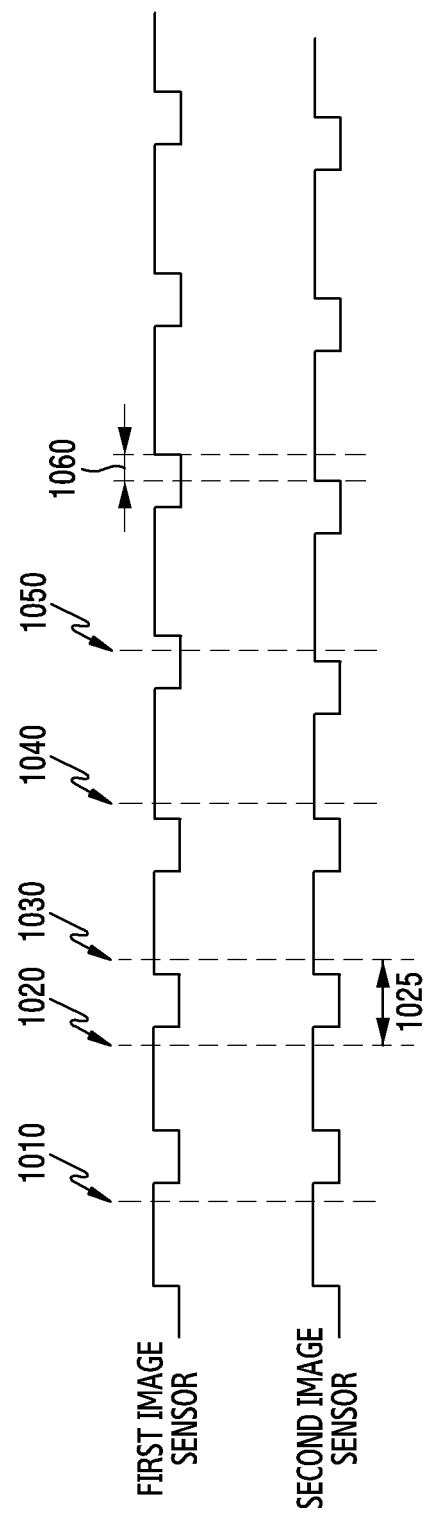
FIG. 10 is a view illustrating an example of reflecting parameter information at different times in a plurality of image sensors according to various embodiments.

FIG. 10 is a view illustrating an example of reflecting parameter information at different times in a plurality of image sensors according to various embodiments.

Referring to FIG. 10, according to a related-art method, the processor 120 may transmit parameter information to the first image sensor 230-1 and the second image sensor 230-2 at a first time 1010. For example, the parameter information may indicate that an exposure time is changed from 10 ms to 40 ms, and frame per second (fps) is changed from 30 f to 24 f. However, the first image sensor 230-1 may receive the parameter information (for example, first parameter information) at a second time 1020, and the second image sensor 230-2 may receive the parameter information (for example, second parameter information) at a third time 1030. That is, even when the processor 120 transmits the parameter information simultaneously, there may be a delay time in transmitting information between I2C channels due to system limitations. In this case, the time (for example, the second time 1020) at which the first image sensor 230-1 receives the first parameter information, and the time (for example, the third time 1030) at which the second image sensor 230-2 receives the second parameter information may be different from each other. That is, there may be a time difference 1025 between the second time 1020 and the third time 1030.

Furthermore, according to the related-art method, the first image sensor 230-1 may reflect the first parameter information at a fourth time 1040, and the second image sensor 230-2 may reflect the second parameter information at a fifth time 1050. That is, since the first image sensor 230-1 and the second image sensor 230-2 reflect the parameter information at different times, there may be a time difference 1060 between a frame obtained by the first image sensor 230-1 and a frame obtained by the second image sensor 230-2. In this case, the frame obtained by the first image sensor 230-1 and the frame obtained by the second image sensor 230-2 are synchronized before, but, when the changed parameter is applied, a frame of a first image obtained by the first image sensor 230-1 and a frame of a second image obtained by the second image sensor 230-2 may not be synchronized with each other due to a time difference in reflecting the parameter, and accordingly, motions of an object overlap each other or sharpness of the image may be reduced. In addition, a separate command may be required to synchronize the asynchronized frames again, or a time may be required until the sensors are synchronized with each other by referring to a separate signal.

That is, according to the present disclosure, even when the plurality of image sensors 230-1, 230-2 receive the parameter information at different times, the times to reflect the parameter information may be synchronized with each other.

Figure 11:
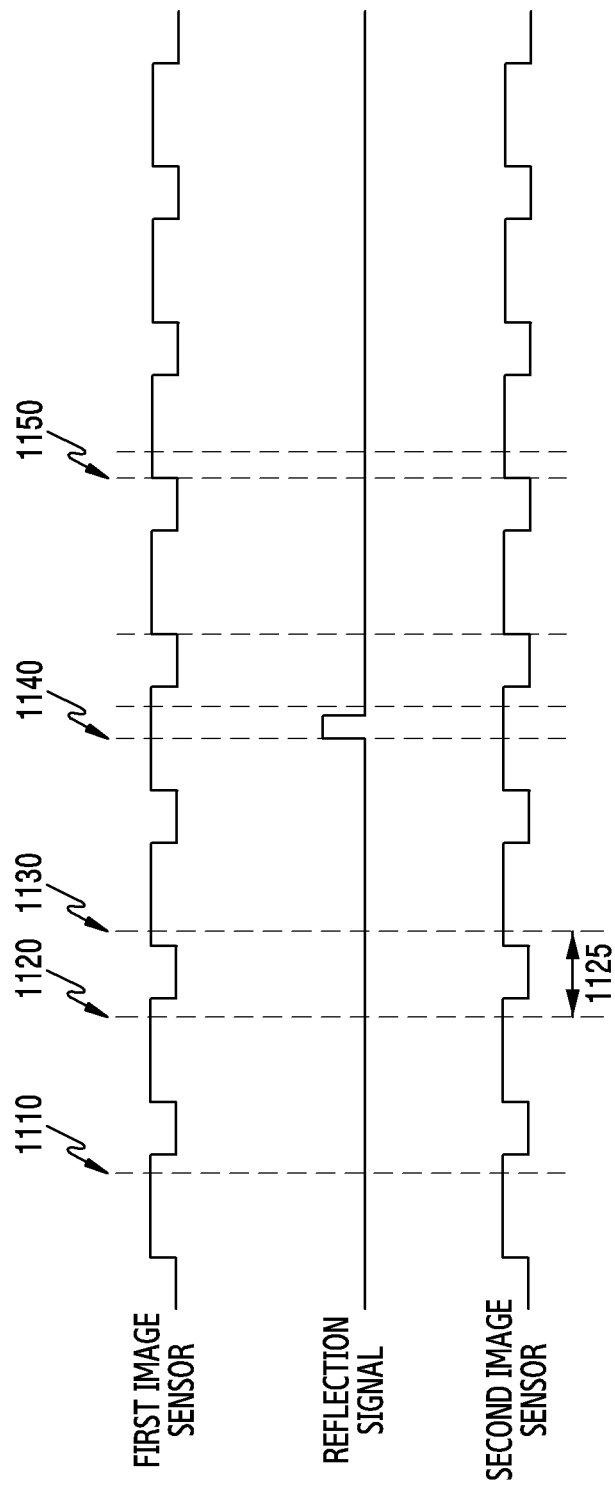
FIG. 11 is a view illustrating an example of reflecting parameter information at the same time in a plurality of image sensors according to various embodiments.

FIG. 11 is a view illustrating an example of reflecting parameter information in the plurality of image sensors at the same time according to various embodiments.

Referring to FIG. 11, the processor 120 according to the present disclosure may transmit parameter information to the first image sensor 230-1 and the second image sensor 230-2 at a first time 1110. For example, the parameter information may indicate that an exposure time is changed from 10 ms to 40 ms, and frame per second (fps) is changed from 30 f to 24 f However, the first image sensor 230-1 may receive the parameter information (for example, first parameter information) at a second time 1120, and the second image sensor 230-2 may receive the parameter information (for example, second parameter information) at a third time 1130. That is, even when the processor 120 transmits the first parameter information and the second parameter information at the same time, the time (for example, the second time 1120) at which the first image sensor 230-1 receives the first parameter information, and the time (for example, the third time 1130) at which the second image sensor 230-2 receives the second parameter information may be different from each other, and thus there may be a time difference 1125.

However, the processor 120 or the first image sensor 230-1 according to the present disclosure may transmit a reflection signal at a fourth time 1140. In this case, the first image sensor 230-1 may reflect the first parameter information at a fifth time 1150, and the second image sensor 230-2 may reflect the second parameter information at the fifth time 1150. That is, even when the first image sensor 230-1 and the second image sensor 230-2 receive the parameter information, the first image sensor 230-1 and the second image sensor 230-2 may wait until the reflection signal is received, and, when the reflection signal is received at the fourth time 1140, may reflect the parameter information simultaneously at the fifth time 1150. In this case, a frame of a first image obtained by the first image sensor 230-1 and a frame of a second image obtained by the second image sensor 230-2 may be synchronized with each other, and thus, the first image and the second image may be obtained at the same time.

Figure 12:
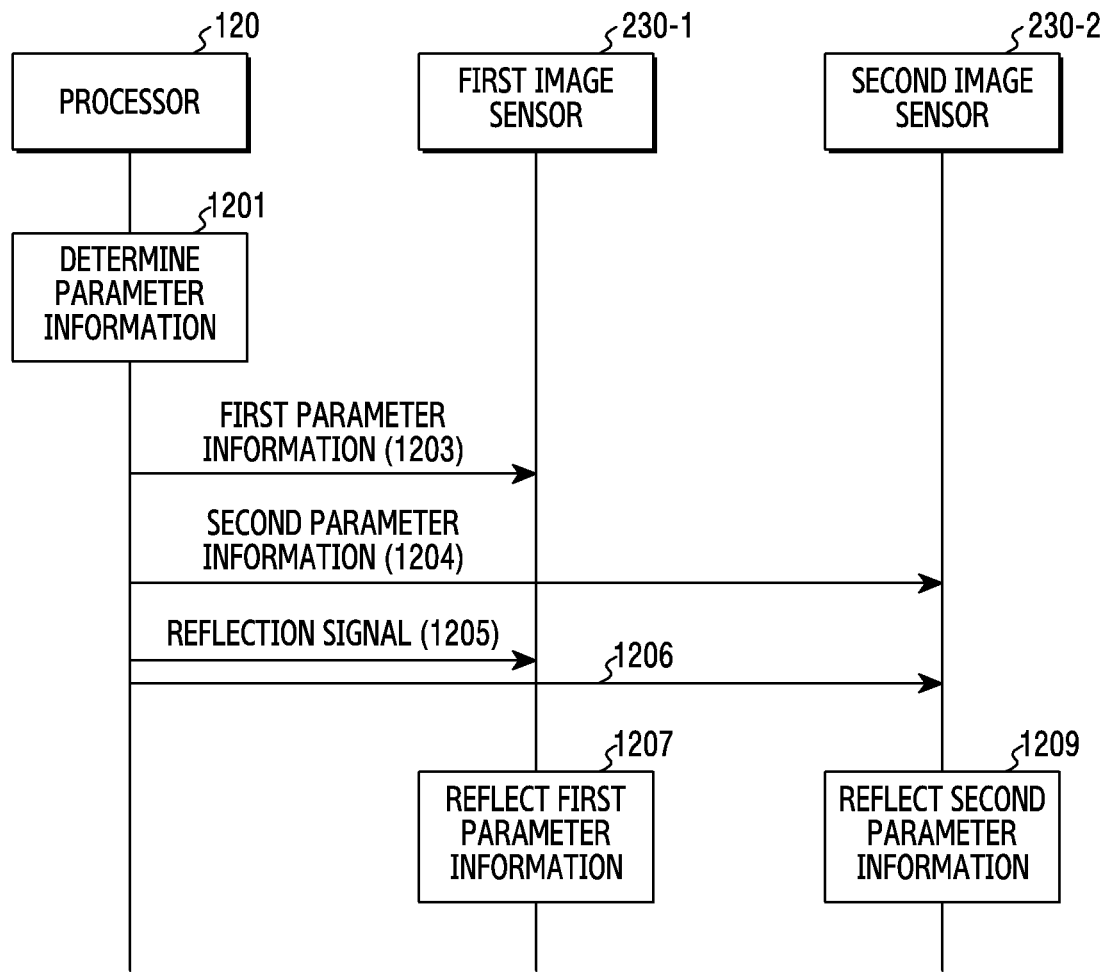
FIGS. 12 and 13 are flowcharts illustrating an operating method of a processor and a plurality of image sensors according to various embodiments.
Figure 13:
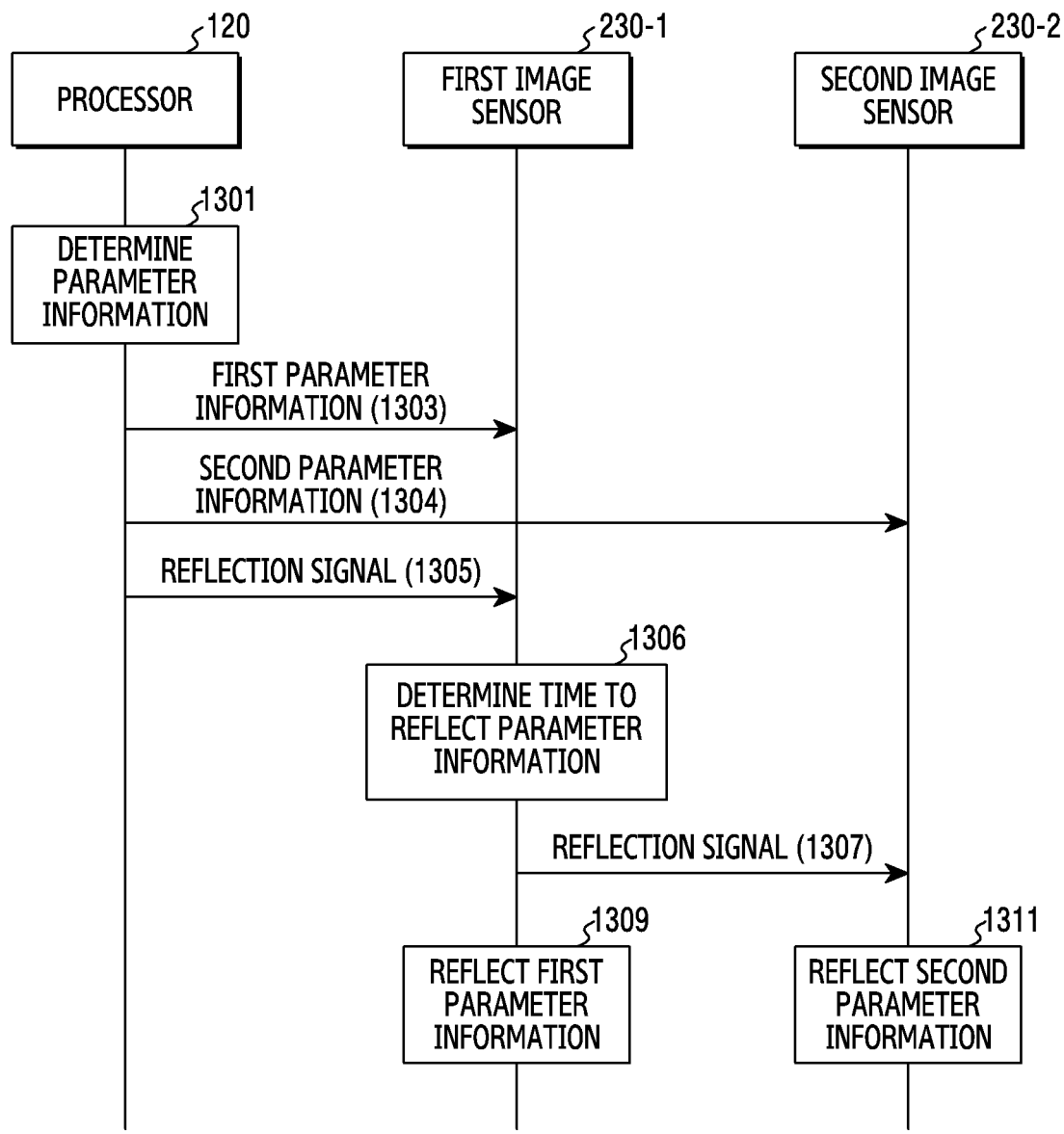

FIGS. 12 and 13 are flowcharts illustrating an operating method of a processor and a plurality of image sensors according to various embodiments.

FIG. 12 is a flowchart illustrating a method for transmitting both parameter information and a reflection signal at the processor.

Referring to FIG. 12, in operation 1201, the processor 120 of the electronic device 101 may determine parameter information. For example, the processor 120 may determine first parameter information for the first image sensor 230-1, and may determine second parameter information for the second image sensor 230-2. The first parameter information and the second parameter information may be the same as or different from each other.

In operation 1203, the processor 120 of the electronic device 101 may transmit the first parameter information to the first image sensor 230-1. For example, the processor 120 may transmit the first parameter information to the first image sensor 230-1 through the first I2C channel 125.

In operation 1204, the processor 120 of the electronic device 101 may transmit the second parameter information to the second image sensor 230-2. For example, the processor 120 may transmit the second parameter information to the second image sensor 230-2 through the second I2C channel 126.

Although it is illustrated that operation 1203 and operation 1204 are distinct from each other, operation 1240 may be performed first and operation 1203 may be performed later, or operation 1203 and operation 1204 may be performed at the same time.

In operation 1205, the processor 120 of the electronic device 101 may transmit a reflection signal to the first image sensor 230-1. The processor 120 may transmit the reflection signal to the first image sensor 230-1 through a signal line (for example, the signal line 127).

In operation 1206, the processor 120 of the electronic device 101 may transmit the reflection signal to the second image sensor 230-2. The processor 120 may transmit the reflection signal to the second image sensor 230-2 through a signal line (for example, the signal line 127). The reflection signal may be divided through the signal line 127, and may be transmitted to the GPIO 233 of the first image sensor 230-1 and the GPIO 237 of the second image sensor 230-2. The processor 120 may calculate a float time based on characteristics of the plurality of image sensors 230-1, 230-2, a hardware configuration and performance of the electronic device 101. The processor 120 may transmit the reflection signal after the float time.

In operation 1207, the first image sensor 230-1 of the electronic device 101 may reflect the first parameter information. In operation 1209, the second image sensor 230-2 of the electronic device 101 may reflect the second parameter information. That is, even when the first image sensor 230-1 and the second image sensor 230-2 receive the parameter information, respectively, at different times, the times at which the parameter is reflected may be synchronized with each other (for example, made to coincide with each other) by the reflection signal transmitted by the processor 120.

FIG. 13 is a flowchart illustrating a method by which a processor transmits parameter information and a master image sensor transmits a reflection signal.

Referring to FIG. 13, in operation 1301, the processor 120 of the electronic device 101 may determine parameter information. For example, the processor 120 may determine first parameter information for the first image sensor 230-1, and may determine second parameter information for the second image sensor 230-2. The first parameter information and the second parameter information may be the same as or different from each other.

In operation 1303, the processor 120 of the electronic device 101 may transmit the first parameter information to the first image sensor 230-1. For example, the processor 120 may transmit the first parameter information to the first image sensor 230-1 through the first I2C channel 125.

In operation 1304, the processor 120 of the electronic device 101 may transmit the second parameter information to the second image sensor 230-2. For example, the processor 120 may transmit the second parameter information to the second image sensor 230-2 through the second I2C channel 126.

Although it is illustrated that operation 1303 and operation 1304 are distinct from each other, operation 1304 may be performed first and operation 1303 may be performed later, or operation 1303 and operation 1304 may be performed at the same time.

In operation 1305, the first image sensor 230-1 of the electronic device 101 may receive a reflection signal from the processor 120. The processor 120 may transmit the reflection signal instructing to reflect the first parameter information to the first image sensor 230-1 through the signal line 127. The first image sensor 230-1 may receive the reflection signal instructing to reflect the first parameter information from the processor 120 through the first GPIO 232.

In operation 1306, the first image sensor 230-1 of the electronic device 101 may determine a time to reflect the parameter information. The first image sensor 230-1 may determine a time to transmit the reflection signal, based on a delay time at which the second parameter information is transmitted to the second image sensor 230-2. For example, when the first parameter information is received at the N-th frame, the first image sensor 230-1 may determine the N+1-th frame as the reflection time.

In operation 1307, the first image sensor 230-1 of the electronic device 101 may transmit the reflection signal to the second image sensor 230-2. For example, the first image sensor 230-1 may transmit the reflection signal to the second image sensor 230-2 through the second GPIO 233.

In operation 1309, the first image sensor 230-1 of the electronic device 101 may reflect the first parameter information. In operation 1311, the second image sensor 230-2 of the electronic device 101 may reflect the second parameter information. That is, when the first image sensor 230-1 and the second image sensor 230-2 receive the parameter information, respectively, at different times, the times to reflect the parameter may be synchronized with each other (for example, made to coincide with each other) by the reflection signal transmitted from the processor 120.

Figure 14:
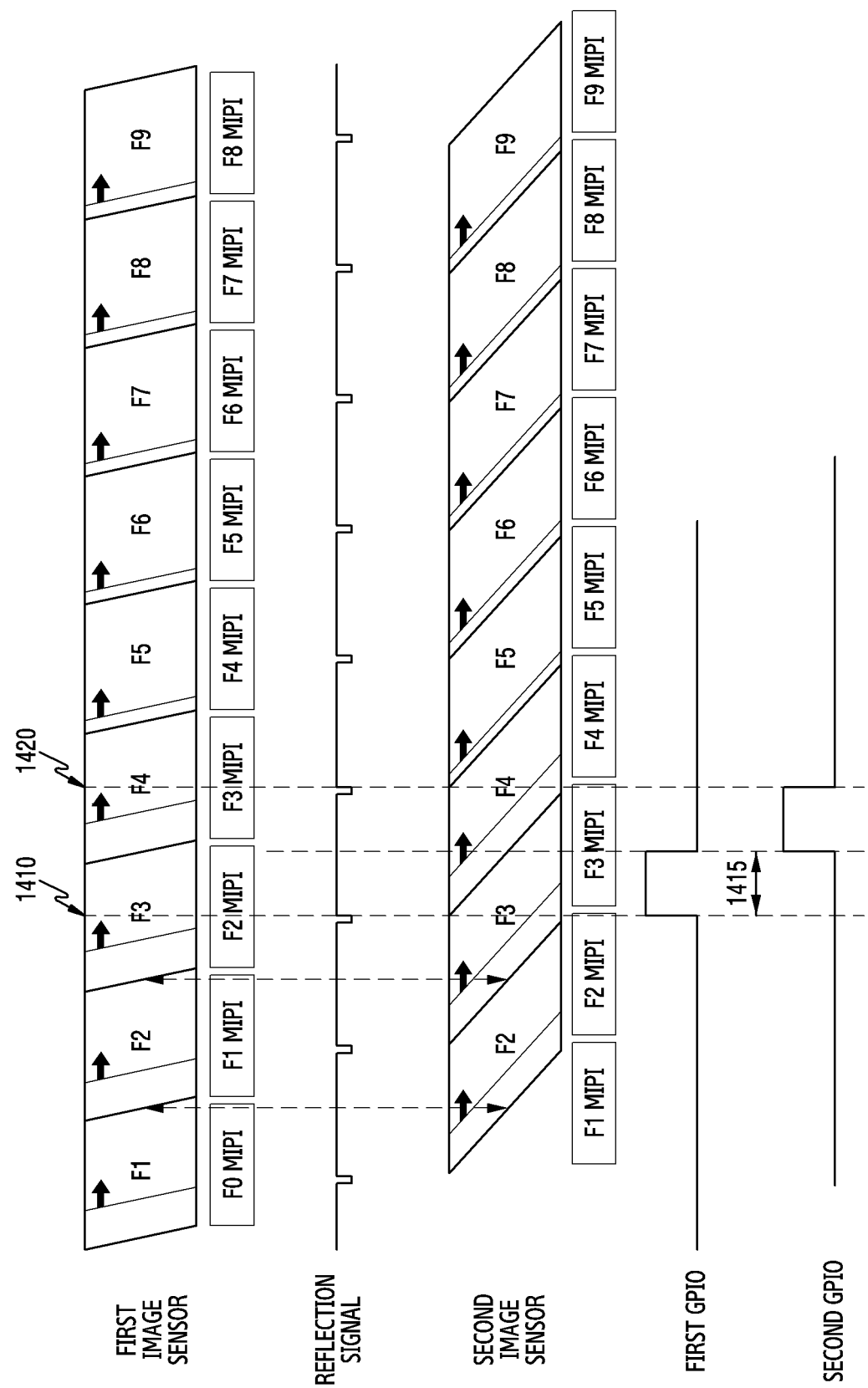
FIG. 14 is a view illustrating an example of transmitting a reflection signal from a master image sensor according to various embodiments.

FIG. 14 is a view illustrating an example of transmitting a reflection signal from a master image sensor according to various embodiments.

Referring to FIG. 14, the first image sensor 230-1 may receive a reflection signal from the processor 120 through the first GPIO 232 at a first time 1410. The first image sensor 230-1 may determine a time to transmit the reflection signal, based on a delay time at which the second parameter information is transmitted to the second image sensor 230-2. The first image sensor 230-1 may transmit the reflection signal to the second image sensor 230-2 through the second GPIO 233 at a second time 1420. That is, the first image sensor 230-1 may transmit the reflection signal to the second image sensor 230-2 after a time difference 1415 from the first time 1410 at which the reflection signal is received from the processor 120. The first image sensor 230-1 may control the parameter information to be reflected from F4 frames by considering the time taken for the second parameter information to be transmitted to the second image sensor 230-2 and the time taken for the reflection signal to arrive at the second image sensor 230-2.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first image sensor;
a second image sensor electrically connected with the first image sensor through a first interface; and
a processor electrically connected with the first image sensor and the second image sensor through a second interface,
wherein the processor is configured to:
determine parameter information for controlling the first image sensor and the second image sensor regarding shooting; and
transmit the parameter information to the first image sensor and the second image sensor through the second interface,
wherein the first image sensor is configured to:
determine a reflection time based on a time at which the processor transmitted the parameter information to the second image sensor;
transmit a reflection signal to the second image sensor through the first interface, wherein the reflection signal indicates the reflection time to reflect the parameter information; and
reflect the parameter information at the reflection time, and
wherein the second image sensor is configured to, in response to receiving the reflection signal, reflect the parameter information at the reflection time.

2. The electronic device of claim 1, wherein the processor is further configured to:
determine first parameter information corresponding to the first image sensor;
determine second parameter information corresponding to the second image sensor;
transmit the first parameter information to the first image sensor; and
transmit the second parameter information to the second image sensor.

3. The electronic device of claim 1, wherein the first image sensor is further configured to transmit the reflection signal to the second image sensor after receiving the parameter information.

4. The electronic device of claim 1, wherein the second image sensor is further configured to:
receive the parameter information; and
after receiving the parameter information, delay an operation of using the parameter information until the reflection signal is received.

5. The electronic device of claim 1, wherein the first image sensor is further configured to reflect the parameter information after transmitting the reflection signal.

6. An electronic device comprising:
a first image sensor;
a second image sensor;
a processor;
a first interface connecting the processor with the first image sensor and the second image sensor; and
a second interface connecting the processor with the first image sensor and the second image sensor,
wherein the processor is configured to:
determine parameter information for controlling the first image sensor and the second image sensor regarding shooting;
transmit the parameter information to the first image sensor and the second image sensor through the second interface;
determine a float time associated with a time taken for the parameter information to be transmitted to the first image sensor and the second image sensor; and
transmit a reflection signal to the first image sensor and the second image sensor through the first interface, wherein the reflection signal indicates a reflection time to reflect the parameter information, the reflection time being determined based on the float time,
wherein the first image sensor is configured to, in response to receiving the reflection signal, reflect the parameter information at the reflection time, and
wherein the second image sensor is configured to, in response to receiving the reflection signal, reflect the parameter information at the reflection time.

7. The electronic device of claim 6, wherein the processor is further configured to:
determine first parameter information corresponding to the first image sensor and second parameter information corresponding to the second image sensor; and
transmit the first parameter information to the first image sensor and transmit the second parameter information to the second image sensor.

8. The electronic device of claim 6, wherein the processor is further configured to transmit the reflection signal through the first interface after transmitting the parameter information.

9. The electronic device of claim 6, wherein the processor is further configured to calculate a time to transmit the reflection signal, based on characteristics of the first image sensor and the second image sensor, a hardware configuration,. and performance of the electronic device.

10. The electronic device of claim 6, wherein the processor is further configured to:
calculate the float time based on a time taken for the parameter information to be transmitted to an output queue of an inter integrated circuit (I2C) channel, and a time taken for the parameter information to be outputted from the output queue; and
transmit the reflection signal after the float time.

11. The electronic device of claim 6, wherein the processor is further configured to determine the parameter information based on at least one of a setting of a user, a state of the electronic device, a shooting mode set in the electronic device, characteristics of the first image sensor and the second image sensor, or whether the first image sensor and the second image sensor are being operated.

12. An electronic device comprising:
a first image sensor;

a second image sensor electrically connected with the first image sensor through a first interface; and
a processor connected with the first image sensor through a second interface,
wherein the processor is configured to:
   determine parameter information for controlling the first image sensor and the second image sensor regarding shooting;
   transmit the parameter information to the first image sensor and the second image sensor; and
   transmit a reflection signal for use of the parameter information through the second interface, and
wherein the first image sensor is configured to:
   receive the reflection signal from the processor through the second interface; and
   transmit the reflection signal to the second image sensor through the first interface to cause the second image sensor to use the parameter information in response to the reflection signal.

13. The electronic device of claim 12, wherein the processor is further configured to:

determine first parameter information corresponding to the first image sensor, and second parameter information corresponding to the second image sensor; and
transmit the first parameter information to the first image sensor, and transmit the second parameter information to the second image sensor.

14. The electronic device of claim 12,
wherein the first image sensor is further configured to:
   determine a time to transmit the reflection signal by considering a time taken for the parameter information to be transmitted to the second image sensor; and
   use the parameter information after transmitting the reflection signal to the second image sensor, and
wherein the second image sensor is further configured to:
   receive the parameter information from the processor;
   delay an operation of using the parameter information until the reflection signal is received; and
   use the parameter information after receiving the reflection signal from the first image sensor.

* * * * *